United States Patent
Ziegler et al.

(10) Patent No.: US 8,347,411 B2
(45) Date of Patent: Jan. 1, 2013

(54) SCANNING PROBE MICROSCOPE AND METHOD FOR OPERATING THE SAME

(75) Inventors: Dominik Ziegler, Zurich (CH); Andreas Christian Stemmer, Muttenz (CH); Jorg Rychen, Zurich (CH)

(73) Assignee: Specs Zürich GmbH, Zurich (CH)

( * ) Notice: Subject to any disclaimer, the term of this patent is extended or adjusted under 35 U.S.C. 154(b) by 311 days.

(21) Appl. No.: 12/306,928

(22) PCT Filed: Jul. 14, 2006

(86) PCT No.: PCT/CH2006/000371
§ 371 (c)(1),
(2), (4) Date: Feb. 20, 2009

(87) PCT Pub. No.: WO2008/006229
PCT Pub. Date: Jan. 17, 2008

(65) Prior Publication Data
US 2009/0307809 A1  Dec. 10, 2009

(51) Int. Cl.
*G01Q 80/00* (2010.01)

(52) U.S. Cl. ............... 850/62; 850/10; 850/11; 850/21; 850/33; 850/37; 850/49; 850/57; 73/105

(58) Field of Classification Search ............. 850/10, 850/11, 21, 33, 37, 49, 57, 62; 73/105
See application file for complete search history.

(56) References Cited

U.S. PATENT DOCUMENTS

| | | |
|---|---|---|
| 6,005,246 A | 12/1999 | Kitamura et al. |
| 2010/0031404 A1* | 2/2010 | Rychen ................ 850/33 |

FOREIGN PATENT DOCUMENTS

| | | |
|---|---|---|
| EP | 0 890 820 | 1/1999 |
| JP | 6201373 A | 7/1994 |
| JP | 06308180 | 11/1994 |
| JP | 11023588 A | 1/1999 |
| JP | 2004294218 A | 10/2004 |

OTHER PUBLICATIONS

International Search Report in corresponding PCT/CH2006/000371 dated Nov. 29, 2006, 3 pages.
Andraka, "A survey of CORDIC algorithms for FPGA based computers," *Andraka Consulting Group, Inc.*, (1998).
Fukuma et al., "Surface potential measurements by the dissipative force modulation method," *Rev. Sci. Instrum.*, 75(11):4589-4594 (2004).

(Continued)

*Primary Examiner* — Jack Berman
*Assistant Examiner* — Meenakshi Sahu
(74) *Attorney, Agent, or Firm* — Marshall, Gerstein & Borun LLP

(57) ABSTRACT

The scanning probe microscope has a primary control loop (7, 11, 12) for keeping the phase and/or amplitude of deflection at constant values as well as a secondary control loop (9) that e.g. keeps the frequency of the cantilever oscillation constant by applying a suitable DC voltage to the probe while, at the same time, a conservative AC excitation is applied thereto. By actively controlling the frequency with the first control loop (7, 11, 12) and subsequently controlling the DC voltage in order to keep the frequency constant, a fast system is created that allows to determine the contact potential difference or a related property of the sample (3) quickly.

10 Claims, 4 Drawing Sheets

OTHER PUBLICATIONS

Jacobs et al., "Practical aspects of Kelvin probe force microscopy," *Rev. Sci. Instrum.*, 70(3):1756-1760 (1999).

Jesse et al., "The band excitation method in scanning probe microscopy for rapid mapping of energy dissipation on the nanoscale," *Nanotechnology*, 18, 435503: 1-8 (2007).

Kobayashi et al., "High-Sensitivity Force Detection by Phase-Modulation Atomic Force Microscopy," *Jpn. J. Appl. Phys.*, 45(30):L793-L795 (2006).

Takahashi et al., "Phase detection of electrostatic force by AFM with a conductive tip," *Ultramicroscopy*, 82:63-68 (2000).

Wu et al., ac driving amplitude dependent systematic error in scanning Kelvin probe microscope measurements: Detection and correction, *Rev. Sci. Instrum.*, 77, 043711 (2006).

Translation of Japanese Office Action for Patent Application No. 2009-519771, dated Jul. 22, 2011.

* cited by examiner

SCANNING PROBE MICROSCOPE AND METHOD FOR OPERATING THE SAME

TECHNICAL FIELD

The invention relates to a scanning probe microscope and a method for operating such a scanning probe microscope.

BACKGROUND ART

Scanning probe microscopes can be used to measure electrical properties of the surface of a sample with high spatial resolution. For example, the local charge, contact potential difference, electrical potential, dielectric constant and polarizability are of interest. Not only high spatial resolution, but also high resolution of the measured quantity is desired.

Generally the term "Kelvin Probe Microscopy" (KPM) is used when the local contact potential is measured. The terms "Kelvin Probe Force Microscopy" (KPFM) or "Kelvin Force Probe Microscopy" are more specific since they indicate that the Kelvin principle works by detecting the force between the two oscillating capacitor electrodes.

T. Fukuma et al. in Rev. Sci. Instrum., Vol. 75, No. 11, pp. 4589-4594 describe a scanning probe microscope having a probe on a cantilever, an oscillator generating a master signal, and an actuator driven by the master signal and applying a mechanical force to the cantilever. In addition to this, a DC voltage source and an AC voltage source are provided for applying a DC voltage and an AC voltage between the probe and the sample. In operation, if the DC voltage is set to the contact potential between the probe and the sample, the force generated by the AC voltage is at a minimum. This allows to determine the contact potential.

DISCLOSURE OF THE INVENTION

It is an object of the present invention to provide a microscope and a method for operating the same that allows to measure electrical properties of the surface quickly and accurately. This object is achieved by the device and method of the independent claims.

In all its aspects, the present invention is based on the combination of an electrostatic and mechanical excitation of the mechanical resonator.

Accordingly, in a first aspect of the invention, the microscope comprises a driver controlling the actuator and being adapted to keep the phase and/or the amplitude of the deflection of the mechanical resonator constant. The driver may e.g. be formed by a "self-excitatory" loop comprising the cantilever and a feedback amplifier, or it may be formed by a primary control loop actively stabilizing the phase and/or the amplitude of the deflection of the mechanical resonator.

The microscope further comprises a secondary control loop having a setpoint for the frequency or amplitude of the master signal and being adapted for controlling the DC voltage in order to keep the frequency or amplitude, respectively, of the master signal at the setpoint. The DC voltage can then be used as a measure for the electrical properties of the surface.

If the driver is designed to keep the phase (but not the amplitude) of the deflection at a constant value, the secondary control loop should try to keep the frequency at the given setpoint. On the other hand, if the driver keeps the amplitude but not the phase of the deflection constant, the secondary control loop should try to keep the amplitude of the master signal at the given setpoint. Finally, if the driver keeps both the amplitude and the phase of the deflection constant, the secondary control loop can either try to keep the amplitude or the frequency of the master signal constant. This design ensures that the secondary control loop strives to keep the quantity (amplitude or phase) constant that is actively controlled by the driver, which allows to achieve a fast response time for the DC voltage.

In a second aspect, the invention relates to a scanning probe microscope having an oscillator generating a master signal having a frequency f, which may be constant or variable. An actuator driven by the master signal applies a mechanical force to the mechanical resonator at frequency f. In addition, a DC voltage source and an AC voltage source are provided for applying a DC and an AC voltage to the probe, the AC voltage also being at frequency f. The device is further provided with a controller having a setpoint for a signal that depends on the phase of the mechanical resonator deflection and for controlling the DC voltage to keep said signal at this setpoint.

Even though this design does not require an active regulation of the frequency or amplitude of the probe deflection at frequency f, it can be fairly fast as long as the mechanical resonator is sufficiently damped (low Q-factor), as it is e.g. the case for measurements in a fluid. In addition, and this applies to the first as well as the second aspect of the invention, using a setpoint for a signal depending on the phase of the mechanical resonator deflection allows for a comparatively accurate measurement since a phase shift can generally be determined precisely.

The invention also relates to a method for operating a scanning probe of these types. Such a method comprises the step of determining an electrical property of the sample, such as the contact potential difference, electrical potential, dielectric constant or polarizability, from the DC voltage applied between the probe and the sample.

Further advantageous embodiments of the invention are described in the dependent claims as well as the following description.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

Before turning to the description of specific embodiments, the following terms used in the description and claims are defined explicitly:

The term "phase of the deflection" designates the phase of the oscillatory deflection motion at frequency f of the mechanical resonator in respect to the master signal.

The term "free resonance" of the mechanical resonator (cantilever) designates a resonance of the mechanical resonator (cantilever) when operating the same at a large distance from the sample, i.e. at a distance where electrostatic interactions between the probe and a sample are negligible.

The terms "electrostatic force" or "electrostatic interaction" refer to the force generated by the applied DC and AC voltages between the probe and the sample. This force or interaction may have an AC component.

Embodiment 1

Figure 1:
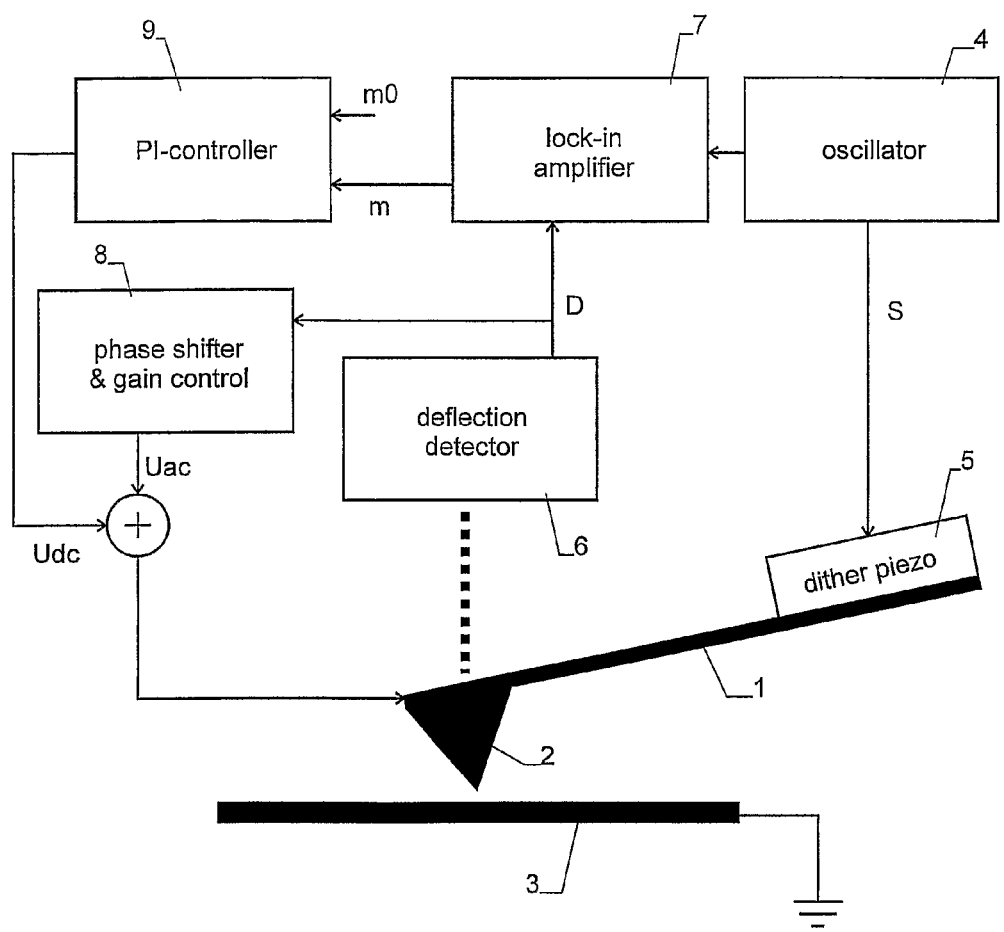
FIG. 1 is a first embodiment of a scanning probe microscope having a fixed frequency oscillator.

FIG. 1 shows a scanning probe microscope having a flexible cantilever 1 and a probe 2 with a fine tip, which are moved along the surface of a sample 3. Cantilever 1 is the mechanical resonator of the microscope.

The scanning probe microscope is provided with suitable means for adjusting the x-, y- and z-position of probe 2 in respect to sample 3. These means, which are not shown in any of the figures, can be implemented in various manner known to the person skilled in the art.

The components shown in the figures represent the parts of the microscope that allow to measure an electrical property of sample 3 depending on the contact potential difference between probe 2 and sample 3. They comprise an oscillator 4 generating a master signal S at a frequency f. Master signal S drives a dither piezo 5, which acts as an actuator applying a mechanical force to cantilever 1. Frequency f is advantageously chosen such that cantilever 1 is excited at or close to one if its resonance frequencies.

The oscillatory deflection of cantilever 1 is measured by a deflection detector 6 and a lock-in amplifier 7. The raw signal D measured by deflection detector 6 is, in the embodiments shown here, assumed to be proportional to and in phase with the present deflection position of the cantilever. (If raw signal D is phase shifted in respect to this deflection, appropriate phase correction is required in the other parts of the signals as known to the person skilled in the art. Raw signal D is fed to a phase shifter & gain control 8, where it is phase shifted by a given phase shift and amplified by a gain to generate an AC voltage Uac with a fixed amplitude. Phase shifter 8 is set to introduce a phase shift $\Delta\phi$ between the deflection (i.e. raw signal D) and voltage Uac that is neither 90° nor 270°. Advantageously, the phase shift $\Delta\phi$ is 0° or 180°, in which case, the electrostatic force applied by voltage Uac to probe 2 is in phase with the oscillation of the probe and are therefore conservative, i.e. the electrostatic force does, in first order approximation, not directly change the amplitude of the oscillation but introduces a phase shift.

Lock-in amplifier 7 measures the phase shift $\phi$ of raw signal D in respect to master signal S, as well as its amplitude A. It generates a measured signal $m(\phi)$, which depends on phase shift $\phi$ and, optionally, on amplitude A of raw signal D, for example $m(\phi)=\phi$ or $m(\phi)=\sin(\phi)\cdot A$.

Measured signal m is fed to a PI-controller 9, which is part of a feedback loop that strives to keep measured signal m at a setpoint m0. PI-controller 9 generates a DC voltage Udc, which is added to AC voltage Uac and applied to probe 2. Sample 3 is grounded such that the voltage between probe 2 and sample 3 equals Uac+Udc.

The operation of the device of FIG. 1 is as follows:

In first step, a suitable setpoint m0 for PI-controller 8 is determined. This can e.g. be carried out using one of the following two methods:

a) Probe 2 is retracted from sample 3 such that no significant electrostatic interaction between probe 2 and sample 3 occurs. In this position, cantilever 1 can oscillate freely at the frequency of master signal f. The measured signal $m(\phi)$ under these conditions is used as setpoint m0. Subsequently, probe 2 is brought into a measuring position closer to sample 3 such that electrostatic interaction takes place.

b) Probe 2 is brought into a measuring position close to sample 3 such that electrostatic interaction between probe 2 and sample 3 occurs. The contact potential difference between probe 2 and sample 3 is measured by conventional means and applied as DC voltage Udc to probe 2 to eliminate electrostatic interaction between probe 2 and sample 3. The measured signal $m(\phi)$ under these conditions is used as setpoint m0. Measuring the contact potential "by conventional means" may e.g. comprise the steps of varying Udc slowly and recording the frequency shift—the point of the maximum frequency shift corresponds to the compensation of the contact potential.

In a next step, PI-controller 9 is activated and probe 2 is moved along sample 3. PI controller 9 will strive to keep $m(\phi)$ at the setpoint value m0, which is the value where the electrostatic force at frequency f between probe 2 and sample 3 is at a minimum (or, in other words, where Udc equals the contact potential difference between probe 2 and sample 3). As long as $m(\phi)=m0$, AC voltage Uac will not generate any force at frequency f. When the contact potential difference changes, AC voltage Uac will generate a force and frequency f between probe 2 and sample 3, which introduces a phase shift in the deflection oscillation. This phase shift in turn changes $m(\phi)$ and causes PI-controller 9 to compensate DC voltage Udc until $m(\phi)$ again becomes m0, i.e. DC voltage Udc will become equal to the new contact potential difference.

Hence, monitoring DC voltage Udc allows to track the contact potential difference as a function of the x- and y-position of probe 2.

Embodiment 2

Figure 2:
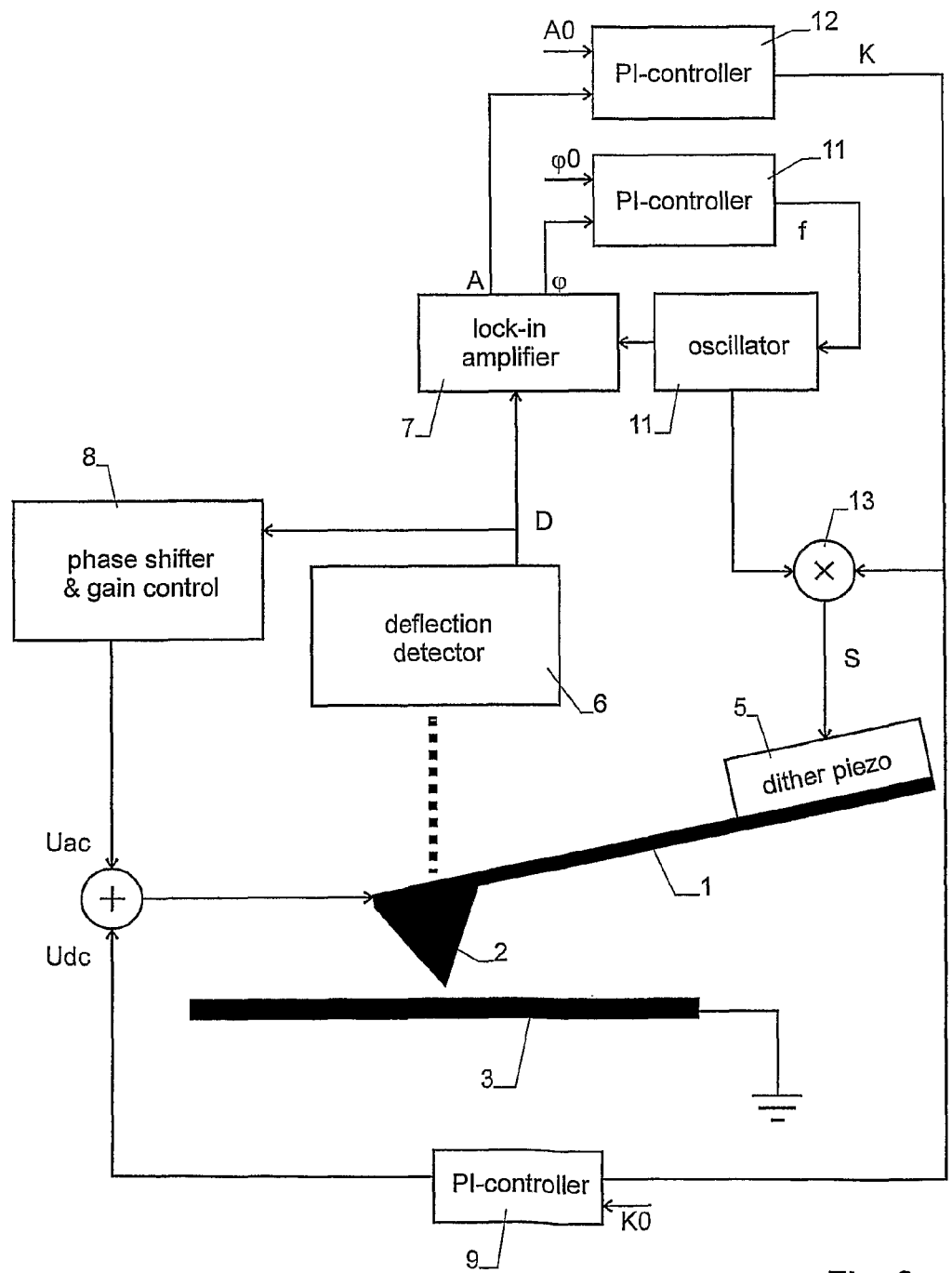
FIG. 2 is a second embodiment of a scanning probe microscope having a variable frequency oscillator and an amplitude-derived bias voltage.

In contrast to the first embodiment, the embodiment shown in FIG. 2 uses a variable frequency oscillator 4 instead of a fixed frequency oscillator for generating master signal S. In addition, two control loops (called "primary control loops" in the following) are used for controlling the frequency f and the amplitude K of the master signal S.

A first primary control loop comprises a first PI-controller 11 comparing the phase $\phi$ from lock-in amplifier 7 with a phase setpoint $\phi0$ and controlling the frequency f of oscillator 4 for keeping phase $\phi$ equal to phase setpoint $\phi0$.

A second primary control loop comprises a second PI-controller 12 comparing the amplitude A from lock-in amplifier 7 with an amplitude setpoint A0 and controlling the amplitude of master signal S for keeping amplitude A equal to amplitude setpoint A0. For this purpose, the output signal K of PI-controller 12 is fed to a multiplier 13, where it is multiplied with the output of oscillator 4 for generating master signal S.

The embodiment of FIG. 2 further comprises a secondary control loop based on PI-controller 9, which receives the output signal K of PI-controller 12 as an input and strives to keep the same equal to a setpoint K0 by adjusting the voltage Udc.

It must be noted that both primary control loops (formed by the PI-controllers 11 and 12) are faster than the secondary control loop (formed by PI-controller 9). In other words, a change of the conditions at probe 2 will first cause PI-controllers 11 and 12 to adjust the frequency and amplitude of master signal S, whereupon PI-controller 9 will act to bring the amplitude of master signal S back to setpoint K0 by adjusting DC voltage Udc, with the adjustment process for DC voltage Udc being so slow that it can be followed by both primary control loops.

In the embodiment of FIG. 2, phase shifter and gain control 8 is set to introduce a phase shift Δφ between Uac and signal D that is not equal to 0 or 180°. Advantageously, it is equal to 90° or 270° such that the electrostatic force generated by AC voltage Uac is dissipative, i.e. it leads to a change of amplitude of the cantilever deflection oscillation, but not to a change of phase.

The operation of the device of FIG. 1 is as follows:

In first step, suitable setpoints φ0 and A0 for the PI-controllers 11 and 12 are determined. Advantageously, phase setpoint φ0 is set to a phase shift of the deflection oscillation when operating cantilever 2 at a free resonance, i.e. at a resonance in the absence of electrostatic forces. Setpoint φ0 can e.g. be found by removing probe 2 far from sample 3 or by applying a voltage corresponding to the contact potential difference to it and then adjusting frequency f until amplitude A is at a maximum, in which case phase φ will be equal to the desired setpoint φ0. A0 is set to the desired maximum amplitude A.

Then, setpoint K0 is found by one of the following two methods:

a) Probe 2 is retracted from sample 3 such that no significant electrostatic interaction between probe 2 and sample 3 occurs. In this position, cantilever 1 can oscillate freely at the frequency of master signal f. The measured signal K under these conditions is used as setpoint K0. Subsequently, probe 2 is brought into a measuring position closer to sample 3 such that electrostatic interaction takes place.

b) Probe 2 is brought into a measuring position close to sample 3 such that electrostatic interaction between probe 2 and sample 3 occurs. The contact potential difference between probe 2 and sample 3 is measured by conventional means and applied as DC voltage Udc to probe 2 to eliminate electrostatic interaction between probe 2 and sample 3. The measured signal K under these conditions is used as setpoint K0.

Finally, probe 2 is moved along sample 3 while recording DC voltage Udc. When the contact potential between probe 2 and sample 3 changes, AC voltage Uac leads to a force at frequency f that increases or decreases the amplitude A of raw signal D, which, in turn, leads to a change of output signal K of PI-controller 12 for keeping the amplitude of the deflection oscillation constant. A change of output signal K will cause PI-controller 9 to change DC voltage Udc until it becomes again equal to the contact difference potential, such that the effect of AC voltage Uac on the electrostatic force on probe 2 becomes zero and output signal K goes back to K0.

The bandwidth of the signal for phase and amplitude at the output of lock-in amplifier 7 in the first embodiment of FIG. 1 was limited by the Q-factor of the resonance. In vacuum, this Q-factor can be between 100,000 and several millions, and thus the bandwidth can be reduced to below 1 Hertz). In the embodiment of FIG. 2 (as well as in the following embodiments) the active control of amplitude and/or phase allows the bandwidth to be much higher (up to 1-2 kHz), thereby improving the response time of the adjustment of Udc.

Embodiment 3

Figure 3:
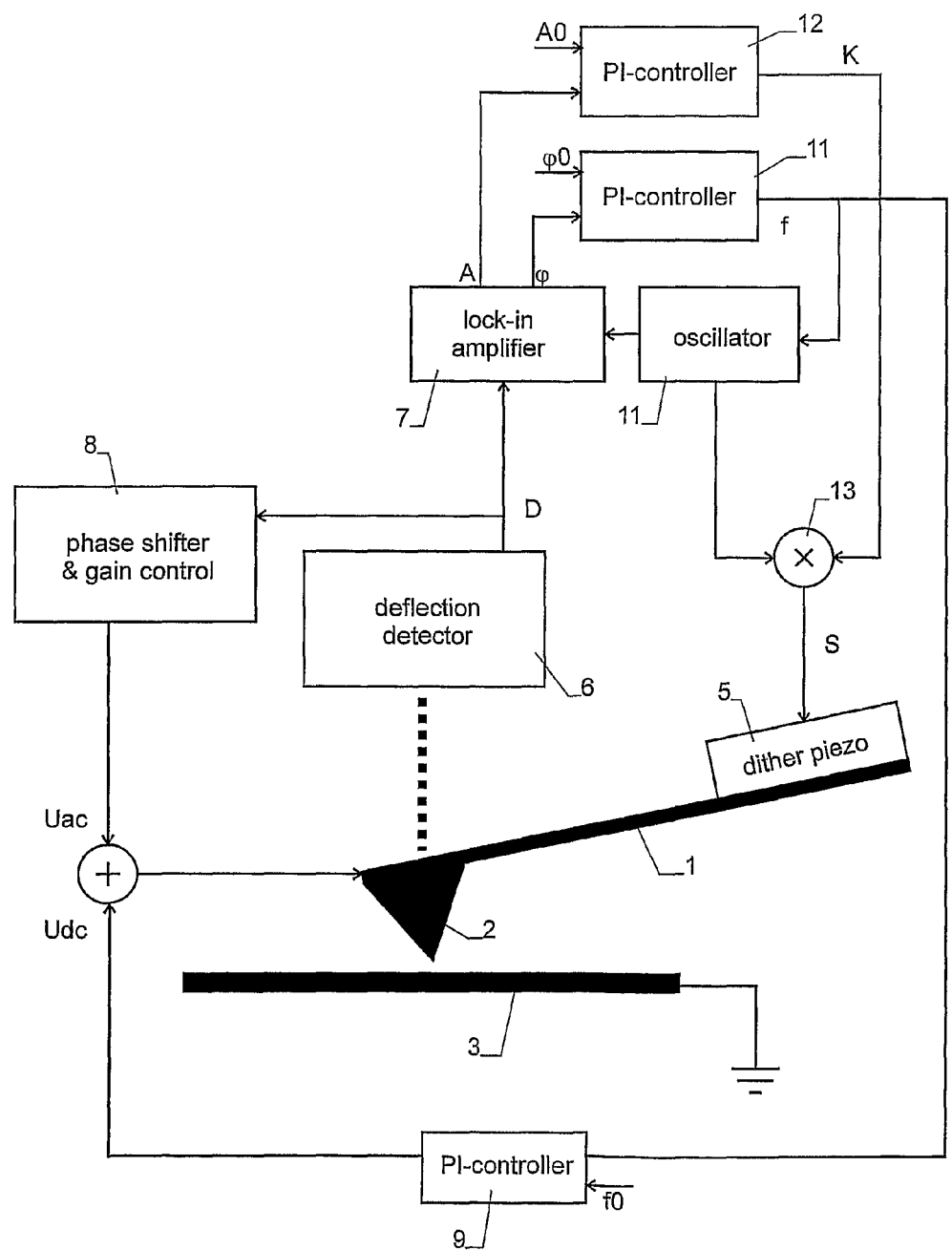
FIG. 3 is a third embodiment of a scanning probe microscope having a variable frequency oscillator and a frequency-derived bias voltage and FIG. 4 is a fourth embodiment of a scanning probe microscope having a self-excitatory design.

The embodiment 3 shown in FIG. 3 is equal to the embodiment 2 of FIG. 2 with the following exceptions:

Phase shifter & gain control 8 is set to introduce a phase shift Δφ between Uac and signal D that is not equal to 90® or 270°. Advantageously, it is equal to 0° or 180° such that the electrostatic force generated by AC voltage Uac is conservative, i.e. its application leads in first order approximation to a phase shift of the cantilever deflection oscillation, but not to a direct change in its amplitude (apart from an amplitude change caused by moving the frequency f in respect to the resonance of the cantilever).

PI-controller 9 tries to keep frequency f (and not amplitude K) at a given setpoint f0 by adjusting DC voltage Udc.

The operation of the embodiment of FIG. 3 is basically the same as the one of the embodiment of FIG. 2, with the exception that setpoint f0 is selected to be the resonance frequency of the cantilever in the absence of electrostatic forces.

In operation, probe 2 is moved along sample 3 while monitoring DC voltage Udc. When the contact potential between probe 2 and sample 3 changes, AC voltage Uac leads to a force at frequency f that changes the phase φ of raw signal D, which, in turn, leads to a change of output signal f of PI-controller 11 for keeping phase φ constant. A change of the frequency f will cause PI-controller 9 to change DC voltage Udc until it becomes again equal to the contact difference potential, such that the effect of Uac on the electrostatic force on probe 2 becomes zero and frequency f goes back to f0.

Embodiment 4

Figure 4:
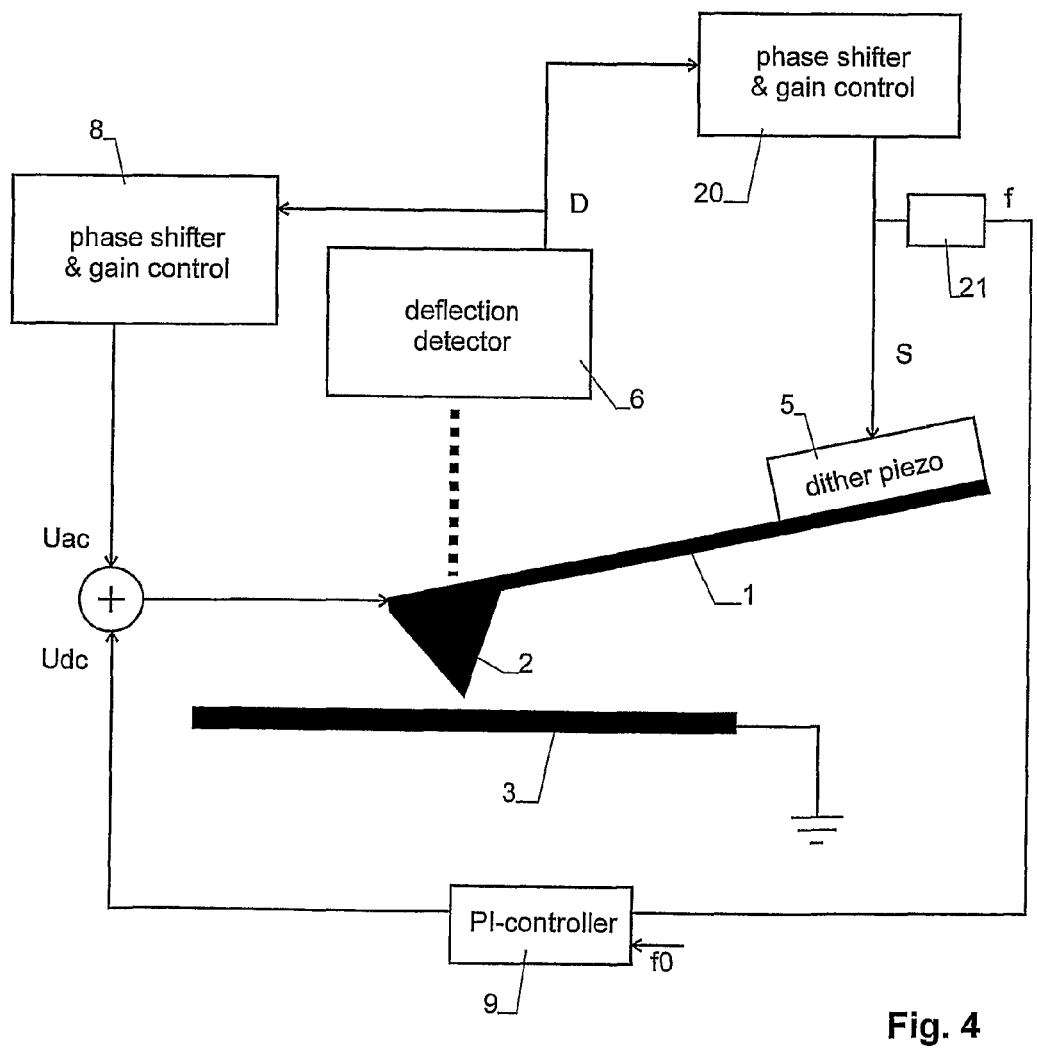

The embodiment of FIG. 4 differs from the one in FIG. 3 in that the two primary control loops have been replaced by a self-excitatory design comprising a phase shifter & gain control 20 that directly feeds a gain-controlled and phase-shifted version of the raw signal D back to dither piezo 5. The phase shift introduced by phase shifter & gain control 20 is such that cantilever is excited at a resonance frequency f. Hence, in this embodiment, the oscillator for generating the primary signal S is formed by the closed loop of deflection detector 6, phase shifter & gain control 20, dither piezo 5 and cantilever 1.

A frequency counter or demodulator 21 feeds the frequency f of the primary signal S to PI controller 9. PI controller 9 tries to keep frequency f equal to a setpoint f0. Setpoint f0 is, as in the third embodiment, selected to be the resonance frequency of the cantilever in the absence of electrostatic forces at frequency f.

The operation of the fourth embodiment is similar to the one of the third embodiment in that if DC voltage Udc is not equal to the local contact potential difference, frequency f deviates from setpoint f0 and PI-controller 9 readjusts DC voltage Udc until it is again equal to the local contact potential difference.

Further embodiments, notes

It is clear from the above that the present invention can be carried out in various different embodiments, some of which are depicted in FIGS. 1 to 4. It must be noted, though, that further designs are possible.

For example, in the embodiment of FIG. 2, the feedback loop for phase shift φ controlled by PI-controller 11 is not strictly necessary for the keeping DC voltage Udc equal to the contact potential difference. However, the advantage of actively regulating phase shift φ to be equal to phase setpoint φ0 lies in the facts that:

for a high Q-factor of the resonator, response times are better and the oscillator follows a shift in resonance frequency, thereby avoiding an undesired change of amplitude.

Similarly, in the embodiment of FIG. 3, the feedback loop for amplitude A controlled by PI-controller 12 is not strictly necessary for keeping DC voltage Udc equal to the contact potential difference. However, using PI-controller 12 has the following advantages:

for a high Q-factor of the resonator, response times are better and the interpretation of the signals is easier if the amplitude is constant.

Even though PI-controllers have been used for the various feedback loops of the shown embodiments, the person skilled in the art will recognize that these can be replaced by controllers with other properties, such as PID controllers. Also, the various feedback loops and other components of the system can at least be implemented in hard- or software or combinations of hard- and software.

Actuator 5 may use a magnetic interaction for applying a force to cantilever 2 instead of using the piezo-effect, or any other suitable means for applying a mechanical force to cantilever 2 can be used.

Phase shifter & gain control 8 can use the master signal S as its input instead of using raw signal D if the phase shift is properly corrected. Phase shifter & gain control 8 can also be inserted between master signal S and actuator 5, while generating Uac from master signal S directly.

As mentioned above, the scanning probe microscope is equipped with suitable means for adjusting the x-, y- and z-position of probe 2 in respect to sample 3. The z-position of the probe can e.g. by controlled by exciting cantilever 1 at another resonance than the resonance used for the measurements mentioned above. Typically, the first resonance (lowest eigenfrequency) of cantilever 1 is used for z-position control while a higher resonance is used for the frequency f used by the above embodiments. The z-position control can e.g. be achieved by exciting cantilever 1 at its lowest eigenfrequency (using a second oscillator) and monitoring the amplitude of the cantilever deflection while approaching probe 2 to sample 3. When probe 2 starts to interact with sample 3, the amplitude will be reduced. The reduction of the amplitude to about 80% of the free oscillation is used as a setpoint for controlling the tip-sample displacement. This method is known to the person skilled in the art under the names of "Tapping Mode", "AM control" or "slope detection". Many other schemes are used for probe-sample control. For example, in the "nc-afm" mode the frequency shift of the oscillation is used for probe-sample control.

In the above embodiments, the mechanical resonator was formed by a cantilever. The person skilled in the art knows various alternatives to cantilevers, such as membranes or other elastically deflectable structures.

While there are shown and described presently preferred embodiments of the invention, it is to be distinctly understood that the invention is not limited thereto but may be otherwise variously embodied and practiced within the scope of the following claims.

The invention claimed is:

1. A scanning probe microscope for measuring properties of a sample comprising
a probe on a mechanical resonator,
an oscillator generating a master signal (S) at a frequency f,
an actuator driven by said master signal (S) and applying a mechanical force to said mechanical resonator at said frequency f,
a DC voltage source applying a DC voltage (Udc) to said probe,
an AC voltage source applying an AC voltage (Uac) at said frequency f to said probe,
a detector measuring a phase and/or amplitude of a deflection of said mechanical resonator,
said scanning probe microscope further comprising
a driver controlling said actuator and being adapted to keep a phase and or an amplitude of said deflection constant and
a secondary control loop having a setpoint for the frequency or amplitude, respectively, of said master signal (S) and controlling said DC voltage (Udc) to keep said frequency or amplitude, respectively, of said master signal (S) at said setpoint,
wherein,
if the driver keeps the phase but not the amplitude of the deflection constant, said secondary control loop keeps the frequency at said setpoint,
if the driver keeps the amplitude but not the phase of the deflection constant, said secondary control loop keeps the amplitude of the master signal (S) at said setpoint or
if the driver keeps the amplitude and phase of the deflection constant, said secondary control loop either keeps the amplitude or frequency of the master signal at said setpoint.

2. The scanning probe microscope of claim 1 wherein said driver comprises a primary control loop having a phase setpoint ($\phi 0$) and/or amplitude setpoint (A0) for the phase and/or amplitude, respectively, of said deflection and controlling a frequency or amplitude, respectively, of said master signal (S) for keeping the phase and/or amplitude, respectively, of said deflection at said phase setpoint ($\phi 0$) and/or amplitude setpoint (A0).

3. The scanning probe microscope of claim 2 wherein said primary control loop is faster than said secondary control loop.

4. The scanning probe microscope of claim 2 having
a first primary control loop having a phase setpoint ($\phi 0$) for the phase of said deflection and controlling the frequency of said master signal (S) for keeping the phase of said deflection at the phase setpoint ($\phi 0$) and
a second primary control loop having an amplitude setpoint (A0) for the amplitude of said deflection and controlling the amplitude of said master signal (S) for keeping the amplitude of said deflection at said amplitude setpoint (A0).

5. The scanning probe microscope of claim 2 wherein said phase setpoint ($\phi 0$) is set to a phase of the deflection when operating said mechanical resonator at a free resonance.

6. The scanning probe microscope of claim 1 wherein,
if said secondary control loop keeps the frequency of said master signal (S) constant, a phase shift of said AC voltage (Uac) in respect to said deflection is such that an electrostatic force generated by said AC voltage (Uac) on said probe is such that it leads, in first order approximation, to a phase shift but not a direct change of amplitude of said deflection or
if said secondary control loop keeps the amplitude of said master signal (S) constant, a phase shift of said AC voltage (Uac) in respect to said deflection is such that an electrostatic force generated by said AC voltage (Uac) on said probe is such that it leads, in first order approximation, to a change of amplitude but not a direct phase shift of said deflection.

7. A method for operating the scanning probe microscope of claim 1 comprising the step of determining an electrical property of said sample from said DC voltage (Udc).

8. The method of claim 7 for operating the scanning probe of claim 2 further comprising the step of setting said phase setpoint ($\phi 0$) or amplitude setpoint (A0) by operating said mechanical resonator at a resonance while said probe is at such a distance from said sample that electrostatic interactions between the probe and a sample are negligible and/or a DC voltage matching the contact potential difference is applied to said probe for eliminating electrostatic interactions between the probe and the sample.

9. A scanning probe microscope for measuring properties of a sample, said microscope comprising a probe on a mechanical resonator, an oscillator generating a master signal (S) at a frequency f, an actuator driven by said master signal (S) and applying a mechanical force to said mechanical resonator at said frequency f, a DC voltage source applying a DC voltage (Udc) to said probe, an AC voltage source applying an AC voltage (Uac) at said frequency f to said probe, a detector measuring an phase and/or amplitude of a deflection of said mechanical resonator, said scanning probe microscope further comprising a controller having a setpoint (m0) for a signal depending on the phase of said deflection and controlling said DC voltage (Udc) to keep said signal at said setpoint and a phase shifter for setting a phase between said AC voltage (Uac) and said deflection such that a force generated by said AC voltage (Uac) at said frequency f to said probe leads to a phase shift of said deflection.

10. A method for operating the scanning probe microscope of claim 9 comprising the step of determining an electrical property of said sample from said DC voltage (Udc).

* * * * *